2,950,266
Patented Aug. 23, 1960

United States Patent Office

2,950,266
CROSS-LINKED POLYCARBONATE RESINOUS COMPOSITIONS AND METHOD FOR PREPARING SAME

Kenneth B. Goldblum, Pittsfield, Mass., assignor to General Electric Company, a corporation of New York No Drawing. Filed Aug. 22, 1957, Ser. No. 679,741

12 Claims. (Cl. 260—43)

This invention relates to polycarbonate resins having desirable physical, chemical and electrical properties, and to their preparation. More particularly, it relates to polycarbonate compositions containing as a constituent part thereof dihydric phenol-derived carbonate units in which the carbonate radical is directly attached to a nuclear carbon atom, i.e., to a carbon atom of an aromatic ring, said polycarbonate compositions containing as a constituent part thereof of a material which serves to cross-link the compositions.

Various types of polycarbonate resins are known, among which are those prepared by the vinyl polymerization of unsaturated carbonate esters, such as allyl carbonates, etc., from the ester interchange of carbonate esters with glycols, and by the reaction of dihydroxymonoaryl compounds such as hydroquinone and resorcinol with phosgene, carbonate esters, or other carbonate precursors. Such polycarbonate materials are of limited usefulness because they do not have a desirable combination of physical properties. More useful are those polycarbonate resins which contain carbonate units derived from dihydric phenols and copolymers of such carbonate resins with other materials. While such compositions are characterized by good physical, chemical and electrical properties and have a relatively high softening point as well as desirable tensile strength, impact strength, and even in certain instances rubber-like elastic properties, they are quite readily soluble in certain organic solvents such as dioxane, chloroform, methylene chloride, tetrahydrofuran, dimethyl formamide, and chlorobenzene, among others, so that their final use is limited to those applications in which they do not come in contact with such organic solvents. Furthermore, while their softening point is generally of the order of about 150° C. and still high for a thermoplastic material, the fact remains that they are thermoplastic and, as such, are not suitable for uses in electrical equipment and the like where temperatures in excess of 150° C. are encountered.

Briefly stated, the compositions of this invention comprise carbonate polymers or resins containing structural units derived from dihydric phenols and copolymers of such resin with other materials, the carbonate units in each instance being attached directly to a nuclear carbon, the resin being cross-linked by means of material which contains more than two hydroxyl groups attached to the same or different phenyl rings of the same molecule. Among such materials are novolac resins, phloroglucinol and 2,4-bis (4'-hydroxy phenyl dimethyl methyl) phenol. Others will occur to those skilled in the art.

Any dihydric phenol compound is useful in the practice of the invention. Such dihydric phenol being defined as a mononuclear or polynuclear phenol type material in which the hydric or hydroxyl groups are attached directly to nuclear carbon atoms. The dihydric phenol compounds used in connection with the invention can typically be represented by the general formula

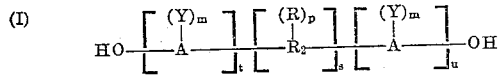

where R is hydrogen or a monovalent hydrocarbon radical, for example, alkyl radicals (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl siloxy, polydiphenylsiloxy, polymethylphenyl siloxy, etc., or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dihydric phenol compound, the substituent Y may be the same or different, as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (Bisphenol–A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis - (4 - hydroxy - 2,6 - dimethyl - 3 - methoxyphenyl)-methane;
1,1-bis-(4-hydroxyphenyl)-ethane;
1,2-bis-(4-hydroxyphenyl)-ethane;

1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls, such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as those set forth in application Serial No. 613,817 filed October 4, 1956 assigned to the same assignee as this invention are also useful, e.g.

bis-(p-hydroxyphenyl)-sulfone;
2,4'-dihydroxydiphenyl sulfone;
5'-chloro-2,4'-dihydroxydiphenyl sulfone;
5'-chloro-2'-4-dihydroxydiphenyl sulfone;
5'-chloro-2'4-dihydroxydiphenyl sulfone;
3'-chloro-4,4'-dihydroxydiphenyl sulfone;
bis (4-hydroxy phenyl) biphenol disulfone, etc.

The preparation of these and other useful sulfones is described in Patent 2,288,282—Huissman. Polysulfones as well as substituted sulfones using halogen, nitrogen, alkyl radicals, etc. are also useful. Dihydroxy aromatic ethers such as those set forth in application Serial No. 598,768 filed July 19, 1955, assigned to the same assignee as this invention, are also useful. Methods of preparing such materials are found in "Chemical Reviews" 38, 414–417 (1946) and Patent 2,739,171—Linn. Exemplary of such dihydroxy aromatic ethers are p,p'-dihydroxydiphenyl ether;
the 4,3'-, 4,2'-, 3,3'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included.

When a carbonate ester is used, the materials are reacted at temperatures of from about 150° C. to 300° C. or higher for times varying from 1 to 15 or more hours. Under such conditions, an ester interchange occurs between the carbonate ester and the dihydric phenol compound, as well as between the carbonate precursor and any other material susceptible of reaction therewith which may be present. The ester interchange is advantageously carried out at reduced pressures of around 10 to 100 mm. of mercury, preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from 150° C. to 300° C. at 0.01 to 5 to 10 mm. of mercury for extended periods of time, tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' "Unit Processes in Organic Synthesis" (4th edition, McGraw-Hill Book Company, 1952), pages 616 to 620. The amount of such catalyst is usually quite small and is of the order of 0.001 to 0.1% by weight, based on the total weight of the reactants.

The diaryl carbonates useful in this connection can be represented by the general formula:

(II) 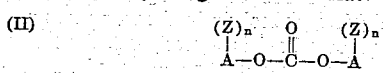

where A is an organic residue in the same sense as in Formula I, Z is an inorganic or organic radical in the same sense as Y of Formula II, and n is an integer. Examples of carbonate esters comprise symmetrical carbonates, for example diphenyl carbonate, di-(halo-phenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc., di(naphthyl) carbonate, di-(chloronaphthyl) carbonate, etc.; unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

Phosgene or phosgene-like dibasic acid halide in an organic basic material such as a tertiary amine (e.g. pyridine, dimethylaniline, quinoline, etc. may also be used in preparing the polycarbonate material). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 mols or more may be employed.

Suitable phosgene-like dibasic acid halides, in addition to phosgene, include, for example, dibromo and diiodocarbonyls as well as the bishaloformates of dihydric phenols (e.g., bischloroformates of hydroquinone, Bisphenol-A, etc.) or glycols (e.g. bischloroformates of ethylene glycol, neopentyl glycol, polyethylene glycol, etc.). Other carbonate precursors will occur to those skilled in the art.

It will be seen that whether a carbonate ester or phosgene is used in the reaction, the dihydric phenol will produce a dihydric phenol carbonate structural unit which can typically be represented by the following general formula wherein the various letters have the same meaning as above:

(III) 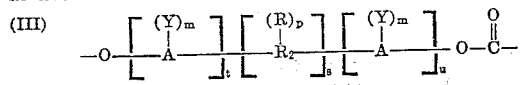

In addition to the polymers described above, copolymers containing carbonate units are also susceptible to cross linking by means of methylene radical-containing materials. Such copolymer compositions are described, for example, in copending application Serial No. 638,239, filed October 4, 1956, assigned to the same assignee as this invention which hereby is included by reference as a part of this application. Other materials which are susceptible to treatment according to this invention are polycarbonate copolymers of dihydric phenols and sulfones as disclosed in copending application Serial No. 679,745, filed August 22, 1957; copolymers of dihydric phenols and aromatic ethers as disclosed in copending application Serial No. 679,746, filed August 22, 1957 and copolymers of dihydric phenols and dibasic acids as disclosed in copending application Serial No. 679,743, filed August 22, 1957, all of the above copending applications being assigned to the same assignee as this invention and being incorporated herein by reference.

The novolac resinous materials which are useful in connection with this invention are well known; generally speaking, they are the acid catalyzed reaction product of phenol or substituted phenols with an amount of formaldehyde or other aldehyde which is insufficient to cause complete cross linking or cure, and which therefore remains in the non-hardened stage. Among the other useful materials which will occur to those skilled in the art and which contain more than two hydroxyl groups attached to the same or different phenyl rings in the same molecule are phloroglucinol and 2,4-bis (4'-hydroxy phenyl dimethyl methyl) phenol.

In general, from about 5% to 100% of the novolac or other material based on the polycarbonate is added to the polycarbonate material depending upon the particular novolac matireal used and upon the particular polycarbonate material employed. The cross-linking material is mixed with a polycarbonate material at a temperature of about 100° C. to 250° C. in any convenient manner in a rubber mill, dough mixer, or similar mixing apparatus. Generally, in a matter of a few minutes, a rubbery, non-melting product is obtained which becomes quite brittle upon cooling.

The following examples will illustrate the practice of the present invention and are not to be taken in any way as limiting insofar as the scope of the invention is concerned.

*Example 1*

The polycarbonate resin used in this example was composed by mixing 345 grams (1.5 mols) Bisphenol–A with 353 grams (1.5 mols) (10% excess) diphenyl carbonate in a kettle equipped with stirrer, thermometer, condenser, collection flask, and a vacuum pump. The mixture was heated at about 5 to 15 mm. mercury pressure and 200 to 250° C. for 6 hours 20 minutes, the phenol being distilled out of the resin kettle. To about 0.5 gram of the above polycarbonate resin was added about 0.2 gram of a novolac resin made from a sulfuric acid catalyzed phenolformaldehyde resin. The ingredients were mixed together with a spatula on a 180° C. steam plate and stroke cured to a rubbery mass which was not soluble in dioxane, whereas the original polycarbonate resin was readily soluble in dioxane.

*Example 2*

The polycarbonate resin used in this example was prepared by mixing together 342 grams of Bisphenol–A and 353 grams of diphenyl carbonate in a resin kettle equipped with a stirrer, thermometer, condenser, collection flask and vacuum pump. After 1 hour of heating, during which the pressure was reduced from atmospheric to 40 mm. of mercury, the phenol began to distilled off slowly. The reaction mixture was then kept at 22 to 27 mm. of mercury for two more hours. The pressure was then reduced to 7 to 13 mm. of mercury for 3 hours 35 minutes more, at which time the phenol distillation was essentially complete. The resulting resin was a light tan, brittle and partially opaque material. To about 0.5 gram of the above polycarbonate there was added about 0.2 gram of a commercial novolac material and the mixture was stroke cured on a 180° C. steam plate. The resulting resin was cross-linked as evidenced by the fact that it was insoluble in dioxane, whereas the original polycarbonate resin was soluble in such solvent.

In addition to adding the novolac resin or other material containing more than two hydroxyl groups attached to the same or different phenyl rings in the molecule to the already-prepared polycarbonate material, the novolac can be added to the original polycarbonate producing materials and the reaction carried out to any desired point to obtain a material which has a particular degree of cross-linking. It has been found that when phosgene-type carbonate precursors are used care must be taken that the cross-linking action of the novolac does not take place too readily. In this case it is preferred to add the novolac constituent in increments.

The following example illustrates the use of novolac in the original mixture:

*Example 3*

There were mixed in a resin kettle equipped with a stirrer, thermometer, condenser, collection flask and vacuum pump 45.6 grams of Bisphenol–A, 47.6 grams of diphenyl carbonate, and 10.0 grams of novolac resin of commercial type. The material was heated to a temperature of about 170° C. over a period of about one hour at a pressure of 125 mm. of mercury. After 76 minutes of heating, when the temperature was 166° C., and the pressure 65 mm. of mercury, a sample taken from this batch stroke cured on a 180° C. hot plate with a spatula in over 2 minutes. After 114 minutes, with the temperature at about 170° C. and the pressure at about 65 mm., a sample taken from the batch gave a gummy stroke cure in about 1½ minutes at 180° C., and after 124 minutes under the same conditions of temperature and pressure, a sample taken gave a gummy stroke cure in about 45 seconds on a hot plate heated to about 180° C. After 131 minutes with the temperature at about 170° C., and the pressure about 16 mm. of mercury, a sample gave a gummy stroke cure on a 180° C. hot plate in about 40 seconds, and after 142 minutes with like conditions of temperature and pressure, a sample gave a gummy spatula-stroked cure in about 35 seconds. The resin when cooled after the 45-second stroke cure test was brown and had a consistency of putty. This resin was readily soluble in dioxane. However, when a 10% by weight solution of the resin in dioxane was poured into a tin metal can and cured for 18½ hours at 180°, the resulting film was not soluble in hot dioxane even after 2 hours treatment, nor did it swell, thus indicating that complete cross-linking had been achieved.

A sample of the above resin containing 20% resin material in dioxane was used as a dip for coiled copper wire which had been cleaned by wiping with paper toweling. These wires after being dipped were hung in a circulating air oven at 180° C. for 1, 6, and 24 hours respectively. After each of these periods, the particular wire was removed from the oven and cooled, then scraped with a knife over a small area, which showed that the film was adhering. One-inch sections cut from each coil of wire were then placed in paradioxane for 14 hours at room temperature, followed by ½ hour treatment at about 80° C. The pieces were then removed from the solvent and dried at 180° C. for 30 minutes. The resulting film coating was not soluble in dioxane, thus indicating that the resin had been completely cross-linked.

It will be seen from the above that novolac resin material is very useful in cross-linking otherwise thermoplastic and organic solvent soluble polycarbonate resins. Not only may the novolac material be added to the polycarbonate resin after the latter has been fully prepared, but it may, as well, be added to the raw materials which go to make up the polycarbonate resin, resulting in a finished cross-linked polycarbonate resin in one step.

The materials of this invention are useful in any applications where a tough, flexible coating or film is required for protecting or insulating a base material. Thus, they are useful as insulating wire coatings, the wire being passed through a solution of the polycarbonate material mixed with a novolac resin and then heated to drive off the solid, leaving a firm, solvent-resistant, flexible high temperature resistant film on the wire. The materials are also useful for making molding compounds which may be used as such or filled with other fillers such as wood flour, silica in various forms, carbon black, divided metal, etc. for making molded parts of various shapes. Films of the material in conventional manner are useful for yarn, threads, bristles, rope, etc. The products of the invention are found very useful as laminating adhesives and as adhesives for other applications. The compositions can also be alloyed with other resinous materials.

What I claim as new and desire to secure by Letters Patent of the United States is:

1. A heat-curable resinous composition comprising the condensation product of (1) a linear carbonate polymer prepared by the reaction of a dihydric phenol and a carbonate precursor selected from the class consisting of carbonate esters, carbonyl halides and haloformates, and (2) not more than about 100%, based upon the weight of (1), of an aromatic material containing more than two hydroxyl groups, all of the hydroxyl groups being attached directly to phenyl rings in the same molecule.

2. A heat-curable resinous composition comprising the condensation product of (1) a linear carbonate polymer prepared by the reaction of a dihydric phenol and a carbonate precursor selected from the class consisting of carbonate esters, carbonyl halides and haloformates, and (2) not more than about 100%, based upon the weight of (1), of a novolac resin.

3. A cross-linked, resinous material comprising the condensation product of (1) a linear carbonate polymer prepared by the reaction of a dihydric phenol and a carbonate precursor selected from the class consisting of carbonate esters, carbonyl halides and haloformates, and (2) not more than about 100%, based upon the weight of (1), of an aromatic material containing more than two hydroxyl groups, all of the hydroxyl groups being attached directly to phenyl rings in the same molecule.

4. A cross-linked, resinous material comprising the condensation product of (1) a linear carbonate polymer prepared by the reaction of a dihydric phenol and a carbonate precursor selected from the class consisting of carbonate esters, carbonyl halides and haloformates, and (2) not more than about 100%, based upon the weight of (1), of a novolac resin.

5. A cross-linked, resinous material comprising the condensation product of (1) a linear carbonate polymer prepared by the reaction of 2,2-bis-(4-hydroxyphenyl)-propane and diphenyl carbonate and (2) not more than about 100%, based upon the weight of (1), of an aromatic material containing more than two hydroxyl groups, all of the hydroxyl groups being attached directly to phenyl rings in the same molecule.

6. A cross-linked, resinous material comprising the condensation product of (1) a linear carbonate polymer prepared by the reaction of 2,2-bis-(4-hydroxyphenyl)-propane and phosgene and (2) not more than about 100%, based upon the weight of (1), of an aromatic material containing more than two hydroxyl groups, all of the hydroxyl groups being attached directly to phenyl rings in the same molecule.

7. The cross-linked, resinous material of claim 3 in the form of a film.

8. The cross-linked, resinous material of claim 3 in the form of a fiber.

9. The cross-linked, resinous material of claim 3 in the form of electrical insulating material.

10. An electrical assembly insulated with the cross-linked, resinous material of claim 3.

11. A laminate in which the laminae are bonded with the cross-linked, resinous material of claim 3.

12. The method of preparing a cross-linked, resinous material comprising condensing (1) a linear carbonate polymer prepared by the reaction of a dihydric phenol and a carbonate precursor selected from the class consisting of carbonate esters, carbonyl halides and haloformates with (2) not more than about 100%, based upon the weight of (1), of an aromatic material containing more than two hydroxyl groups, all of the hydroxyl groups being attached directly to phenyl rings in the same molecule.

References Cited in the file of this patent

UNITED STATES PATENTS

| 2,255,313 | Ellis | Sept. 9, 1941 |
| 2,631,168 | Ross et al. | Mar. 10, 1953 |

FOREIGN PATENTS

| 546,376 | Belgium | Mar. 23, 1956 |